Patented July 27, 1943

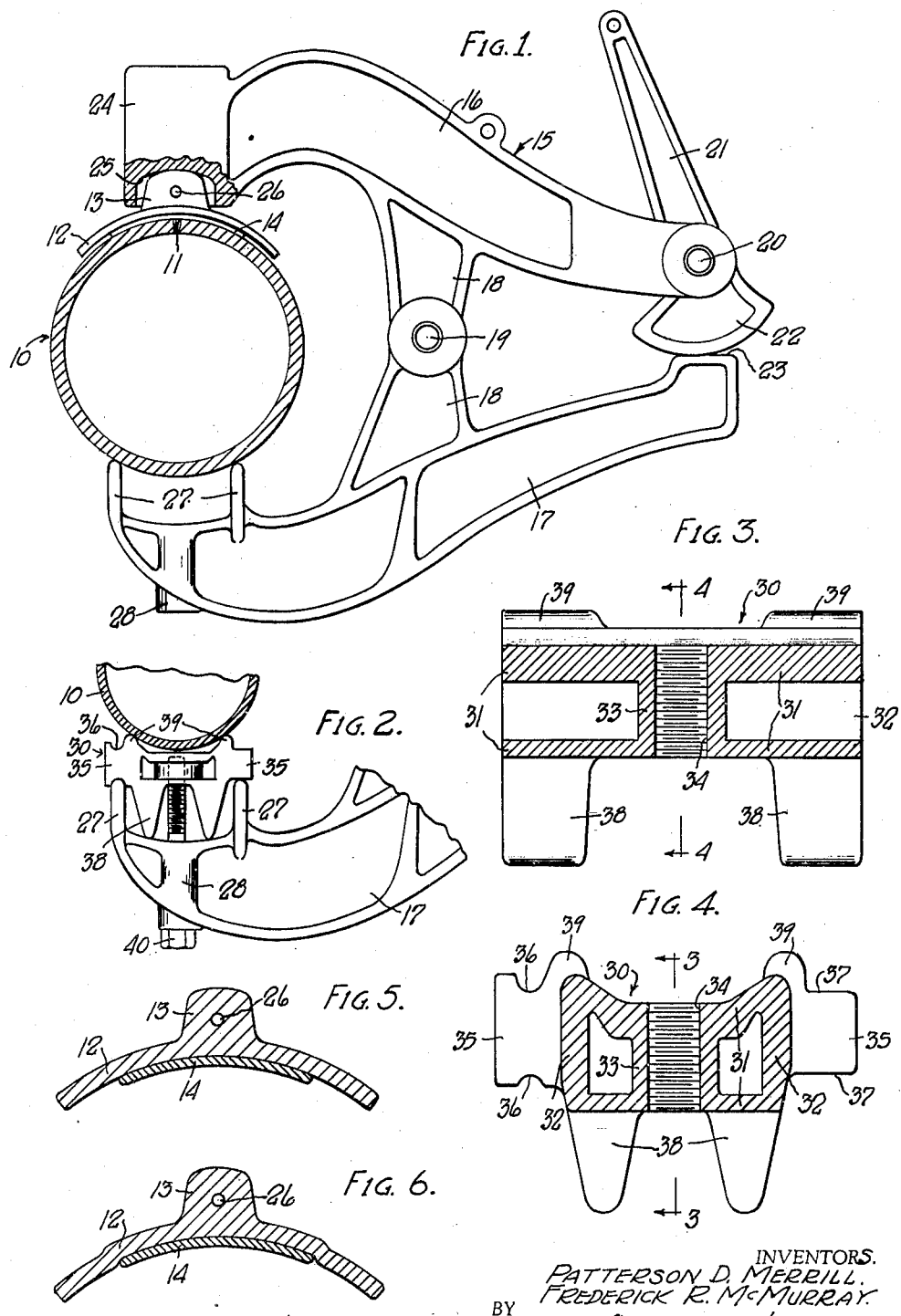

2,325,417

UNITED STATES PATENT OFFICE 2,325,417

MEANS FOR SEALING PIPE LEAKS

Patterson D. Merrill and Frederick R. McMurray, South Bend, Ind., assignors to M. B. Skinner Company, South Bend, Ind., a corporation of Indiana Application October 23, 1940, Serial No. 362,322

6 Claims. (Cl. 81—39)

This invention relates to means for sealing pipe leaks, and more particularly for sealing a leaking pipe by welding thereto a metal patch plate covering the leaking area thereof. The invention is primarily intended for application to pipes containing fluids such as natural gas, illuminating gas, or oil, under high pressures.

Various methods for sealing pipe leaks have been available heretofore. Under one method a sealing element carried by a clamp is compressed against and permanently secured on the pipe by said clamp for the purpose of sealing the leak. This is quite expensive by reason of the necessity of permanent retention of not only the sealing element, but also a retaining clamp, upon the pipe at each leaking area. Another method has been to apply to a leaking pipe a permanent metal patch plate which is welded to the pipe. This later method has heretofore had the disadvantage of requiring an interruption in pipe service during the interval required to weld said plate to the pipe.

Another disadvantages which has been experienced frequently in welding a patch plate is that it is usually necessary to apply the welding patch to the leaking pipe by means of a clamp of a size which is suitable for use only with pipes of a certain predetermined narrow range of sizes. Hence, it has previously been necessary for a repair crew to carry with it a supply of clamps of various sizes in order that any pipe in which a leak develops may be promptly and effectively sealed and patched.

The primary object of this invention is to provide means for clamping patch means to a pipe with an adaptor accommodating clamping of pipes of a wide range of sizes.

A further object is to provide an adaptor for a patch clamp having a pair of spaced abutment members wherein said members are adapted either to directly engage a pipe or to support the adaptor.

A further object is to provide a pipe-engaging adaptor having a pair of spaced ribs projecting from each of two different sides thereof, wherein the ribs on one side are of greater height and narrower spacing than the other ribs.

A further object is to provide a device of this character having pressure applying means including an element normally engaging a pipe, and an adaptor selectively mounted upon said element in either of two positions, and having pipe-engaging ribs projecting from each of two faces thereof, and means for securing said adaptor to said element independently of said ribs.

Other objects will be apparent from the description, drawing, and appended claims.

In the drawing:

Fig. 1 is a view illustrating a leaking pipe in cross section and having the improved leak sealing device applied thereto.

Fig. 2 is a fragmentary view similar to Fig. 1, and illustrates the manner in which an adaptor may be utilized therewith.

Fig. 3 is an enlarged transverse sectional view of the adaptor taken on line 3—3 of Fig. 4.

Fig. 4 is an enlarged transverse sectional view of the adaptor taken on line 4—4 of Fig. 3.

Fig. 5 is an enlarged transverse sectional view of a weld patch plate mounting the improved leak sealing gasket.

Fig. 6 is a view similar to Fig. 5, and illustrates a slightly different construction of welding patch plate.

Referring to the drawing, which illustrates the preferred embodiment of this invention, the numeral 10 designates a pipe having a leaking area 11 therein. A weld patch plate 12 formed of metal, such as an iron casting or the like, is adapted to be applied over the leaking area 11 of the pipe and to be welded to the pipe at its margin or perimeter. Plate 12 is transversely curved in arcuate form to seat snugly on the outer surface of the pipe 10, and carries a projection 13 at the center of its convex face, for purposes to be hereinafter set forth.

A gasket 14 is carried by the inner or concave face of the patch plate 12. The gasket 14 preferably constitutes a sheet of compressed and compacted asbestos fibers which are bonded together in sheet or web form without the use of starch or other adhesive. The material is normally penetrable by gases and liquids, and is preferably highly absorbent, so that when wetted wih water, it will readily absorb the water.

The patch plate 12 is adapted to be applied to the pipe 10 by means of clamp 15. This clamp comprises a pair of elongated members 16 and 17, each provided with an inwardly directed projection 18 intermediate its ends. Suitable pivot means 19 serves to pivotally interconnect the projections 18. Members 16 and 17 are curved so that the outer ends thereof are close spaced, while the opposite or clamping jaw ends thereof are comparatively widely spaced. The first mentioned end of one of the members, such as member 16, has pivotally interconnected thereto, by a pivot pin 20, an elongated lever 21 having cam head 22 whose outer surface is curved eccentrically of the pivot pin 20. The opposite clamp member is provided with a bearing face 23 which is inwardly offset therefrom and against which the cam element 22 may bear.

One of the jaw portions of the clamp terminates in an anvil 24 having a recess 25 in the inner end thereof for loosely receiving the projection 13 of the patch plate 12. Opposite walls of the recessed portion of the anvil are apertured in register with aperture 26 formed in the projection 13, whereby the patch plate 12 may be secured within the recess of the anvil for limited swinging movement. The apertures, including aperture 26 are so disposed as to lie substantially parallel to the axis of the pipe to which the same is to be applied, whereby swinging movement of the jaw 16 to different angular positions will not interfere with proper and full seating of the plate 12 upon the pipe 10. The jaw of member 17 is provided with a pair of inwardly projecting, spaced parallel flanges 27 which extend parallel to the axis of the pipe 10. Flanges 27 are disposed on opposite sides of a projection of the center line of anvil 24 when in the normal position illustrated in Fig. 1. This affords a three-point support or three-point clamping action of the clamp upon the pipe. The free outer end of member 17 is also provided with a cylindrical enlargement 28 positioned to extend substantially at right angles to the axis of the pipe, and this enlargement is provided with a central bore (not shown) for purposes to be hereinafter set forth.

Therefore, it will be observed that in normal use and operation of the device, a patch plate 12 is first connected with the anvil 24 of a clamp by means of a cotter pin (not shown), or other suitable detachable connecting means. The clamp is applied to pipe 10 with the flanges 27 bearing upon the pipe at points thereof opposite the leaking area 11 of the pipe, and with the gasket 14 and plate 12 substantially centered upon and covering the leaking area of the pipe. The jaws of the clamp are then urged in the direction of each other by operation of the lever 21 to shift cam 22 upon bearing face 23. After the plate 12 has been welded to the pipe around its entire margin, the clamp may be disconnected therefrom by releasing lever 21 and detaching the cotter pin or other clamp-carried securing means passing through plate aperture 26.

It will be observed that the clamp 15 is of such construction and character, by reason of the use of cam 22 thereof for pressure applying purposes, that it will accommodate itself to pipes of only a restricted range of sizes. Therefore, if the clamp is to be operative for use with pipes of other sizes, it is necessary to use an adaptor therewith. An adaptor 30 for this purpose is illustrated in Figs. 3 and 4. This adaptor comprises a unitary member, preferably a casting, having a body member comprising parallel, spaced, opposed, normally horizontal walls 31, narrow opposite end walls 32, and a central stud portion 33 extending between the walls 31, all formed integrally. Portion 33 is provided with a central screw-threaded bore 34, for purposes to be hereinafter set forth. A pair of lugs 35 project from opposite ends of each of the two vertical walls 32 in laterally outwardly directed relation thereto. The lugs at one side of the device are provided with aligned grooves 36 parallel to walls 32 in each of the upper and lower faces thereof; while the upper and lower faces 37 of the opposite lug 35 are flat and lie in parallel planes which are respectively intersected by the lowermost or innermost portions of the grooves 36. Each of the faces or walls 31 has projecting therefrom at opposite sides thereof a set of longitudinally aligned, spaced rib portions. The rib portions 38 projecting from one face thereof are spaced apart a dimension less and are of greater height than the ribs 39 projecting from the opposite face or wall.

As best illustrated in Fig. 2, the adaptor 30 may be mounted upon the jaw 17 of the clamp 15 with the lugs 35 thereof supported upon the flanges 27 of said clamp element. One of the flanges 27 extends into the set of grooves 36 in one face of one set of lugs 35, and the other flange 27 engages the other set of lugs at one of the plane faces 37 thereof. When the adaptor is properly positioned upon the clamp, a securing member, such as a bolt 40, is passed through the bore of portion 28 of the clamp part 17 and is threaded into the bore 34 of the adaptor to fixedly secure the adaptor to the clamp. The ribs 39 are positioned upwardly or inwardly when the adaptor is so secured, whereby the pipe 10 may rest thereon. Both sets of ribs 39 and 38 of the adaptor are spaced apart a distance less than the spacing of flanges 27 of the clamp. This factor, together with the respective different heights of said ribs and the support of the adaptor at lugs 35, accommodates selective positioning of the adaptor in a manner to support, engage, and clamp pipes of two different size ranges. For example, assuming that the clamp 15 is adapted to clamp pipes whose diameter is approximately four inches, the adaptor 30 may be placed upon the clamp as illustrated in Fig. 2 for the purpose of accommodating and clamping itself to pipes of approximately three-inch diameter, or may be reversed from the position illustrated in Fig. 2, whereby the ribs 38 are uppermost and are adapted to accommodate pipes of approximately two-inch diameter.

It will be obvious that the use of adaptor 30 involves a change in the relation of the axis of the pipe being clamped, with respect to both anvil 24 and clamp pivot 19. However, the pivotal mounting of the patch plate relative to anvil 24 at aperture 26 accommodates such change in relation of the parts, and thereby insures snug seating of the patch plate on the pipe and application of sealing pressure to the plate by the clamp.

The use of the asbestos gasket 14 successfully seals the leak 11 in pipe 10 during the welding operation, and thereby eliminates any necessity for interruption of pipe service during the welding operation. Asbestos is not generally feasible for leak sealing purposes, and the instant gasket formed therefrom is fluid-pervious as above described. In the instant case this very property of perviousness is utilized to create a seal. Thus, the gasket is wetted with water before being applied to the pipe, and when pressure is applied to the wetted gasket by or through the patch plate, the gasket serves to effectively seal the pipe leak. This result can be achieved effectively only when the fibrous asbestos used in the gasket has not been bound by starch or other adhesives which would tend to reduce gasket absorbency. While the exact reason for the effectiveness of the wetted absorbent asbestos gasket as a sealing element is not known, it appears that the absorption of water thereby tends to soften the fibers so that they may be so firmly compacted by pressure applied by the plate as to assume the properties of a homogenous body having a flexibility sufficient to permit an intimate engagement thereof with the pipe. In any event, it has been found that the wetted asbestos gasket will seal the pipe leak effectively, even against high pressure leaking gas, and will maintain the seal during the entire time required to weld the margin of patch plate 12 by the use of an acetylene torch generating heat sufficient to cause failure of all gasket materials heretofore tested.

If desired, the plate 12 may have its margin slightly offset as shown in Fig. 6. This construction forms a pocket for the gasket effective to retain the gasket when the pipe carries fluids at very high pressures, and has the additional advantage of positioning the plate margin close to the pipe to facilitate welding.

I claim:

1. In a pipe leak sealing device including a pair of clamp elements adapted to apply pressure against opposite sides of a pipe, an adaptor, means for securing said adaptor to one of said elements, said adaptor having a pair of parallel pipe-engaging ribs projecting from each of two opposed faces thereof, and element-engaging adaptor faces laterally outwardly off-set from the bases of said ribs, the ribs at one face of said member being spaced apart a distance greater than and projecting from said element a shorter distance than the ribs at the opposite face of said member.

2. An adaptor for a pipe clamp having a pressure applying member provided with a pair of parallel projections, comprising a body portion adapted to seat on said projections and a pair of spaced parallel ribs projecting from intermediate portions of each of two opposed sides of said body portion and both spaced closer than said clamp projections, the ribs of one of said pairs being of a different height and spacing than the ribs of the other pair.

3. An adaptor as defined in claim 2 wherein said body portion is provided with a screw threaded bore adapted to receive a securing member projecting from said pressure applying member.

4. An adaptor as defined in claim 2, wherein the sides of said body member opposite said ribbed sides are each provided with a guide groove adapted to receive one of the projections of the said pressure applying member to accurately position said adaptor on said pipe clamp.

5. The combination with a pipe clamp having opposed pressure applying elements, one of said elements having a pair of spaced parallel ribs for engaging pipes of a predetermined limited size range, of a shallow adaptor having a pair of ribs projecting from each of two opposed faces thereof, one set of adaptor ribs being spaced apart a distance greater and projecting from said adaptor a distance less than the other set of ribs, said adaptor bearing on said clamp ribs outwardly of said adaptor ribs and means for securing said adaptor to said ribbed clamp element spaced from said ribs, said adaptor accommodating selective gripping by said clamp of pipes of either of two different size ranges smaller than said first mentioned range.

6. A pipe-engaging adaptor comprising a narlow body portion having a central transverse screw-threaded bore, two sets of longitudinally spaced aligned ribs projecting from each of two opposite faces of said body portion, wings projecting laterally from said body portion outwardly of said ribs, one of said wings being grooved parallel to said ribs and the other having a plane supporting face, the ribs projecting from one face of said body member being spaced apart and of a height different from the spacing and height of the ribs at the opposite face of said body member.

PATTERSON D. MERRILL.
FREDERICK R. McMURRAY.